(12) United States Patent
Sanders et al.

(10) Patent No.: US 10,197,397 B2
(45) Date of Patent: Feb. 5, 2019

(54) SMALL LOW COST RESONATOR FIBER OPTIC GYROSCOPE WITH REDUCED OPTICAL ERRORS

(71) Applicant: Honeywell International Inc., Morristown, NJ (US)

(72) Inventors: Glen A. Sanders, Scottsdale, AZ (US); Lee K. Strandjord, Tonka Bay, MN (US); Tiequn Qiu, Glendale, AZ (US); Jianfeng Wu, Tucson, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 47 days.

(21) Appl. No.: 14/526,300

(22) Filed: Oct. 28, 2014

(65) Prior Publication Data

US 2015/0369606 A1    Dec. 24, 2015

Related U.S. Application Data

(60) Provisional application No. 62/014,662, filed on Jun. 19, 2014.

(51) Int. Cl.
   *G01C 19/72*   (2006.01)
(52) U.S. Cl.
   CPC .................. *G01C 19/727* (2013.01)
(58) Field of Classification Search
   CPC .................................................. G01C 19/727
   See application file for complete search history.

(56) References Cited

U.S. PATENT DOCUMENTS

| 4,274,742 A |   | 6/1981 | Lustig |
| 4,326,803 A | * | 4/1982 | Lawrence ............ G01C 19/727 356/461 |

(Continued)

FOREIGN PATENT DOCUMENTS

| EP | 2189754 | 5/2010 |
| EP | 2428767 | 3/2012 |

(Continued)

OTHER PUBLICATIONS

Hotate, Kazuo, and Michiko Harumoto. "Resonator fiber optic gyro using digital serrodyne modulation." Journal of Lightwave Technology 15.3 (1997): 466-473.*

(Continued)

*Primary Examiner* — Tri Ton
*Assistant Examiner* — Rufus Phillips
(74) *Attorney, Agent, or Firm* — Fogg & Powers LLC

(57) ABSTRACT

Systems and methods for a small low cost resonator fiber optic gyroscope (RFOG) with reduced optical errors are provided. In one embodiment, a RFOG comprises: a light source; an optical chip configured to couple a clockwise optical signal and a counterclockwise optical signal from the light source into a fiber optic resonator and couple the clockwise optical signal and the counterclockwise optical signal from the fiber optic resonator to at least one photodetector. The fiber optic resonator comprises a fiber optic coil having a first end point and a second end point. The fiber optic coil has a 90-degree splice located substantially halfway between the first end point and the second end point, is wrapped around a first fiber stretcher located between the first end point and the 90-degree splice, and is wrapped around a second fiber stretcher that is located between the second end point and the 90-degree splice.

11 Claims, 6 Drawing Sheets

(56) References Cited

U.S. PATENT DOCUMENTS

| | | | |
|---|---|---|---|
| 4,514,088 A * | 4/1985 | Coccoli | G01C 19/727 356/461 |
| 4,530,097 A * | 7/1985 | Stokes | G01C 19/66 356/461 |
| 4,637,722 A * | 1/1987 | Kim | G01C 19/726 356/464 |
| 4,673,293 A | 6/1987 | Sanders | |
| 5,018,857 A * | 5/1991 | Sanders | G01C 19/727 356/461 |
| 5,018,858 A | 5/1991 | Malvern | |
| 5,137,356 A * | 8/1992 | Malvern | G01C 19/727 356/461 |
| 5,239,362 A | 8/1993 | Kajioka | |
| 5,349,441 A * | 9/1994 | Sanders | G01C 19/727 356/461 |
| 5,351,252 A * | 9/1994 | Toyama | H01S 3/302 356/461 |
| 5,493,623 A | 2/1996 | Frische et al. | |
| 5,606,415 A * | 2/1997 | Doty | G01C 19/721 250/227.24 |
| 7,327,460 B2 * | 2/2008 | Sanders | G01C 19/727 356/461 |
| 7,463,360 B2 | 12/2008 | Hughes et al. | |
| 7,855,789 B2 | 12/2010 | Strandjord et al. | |
| 7,933,020 B1 | 4/2011 | Strandjord et al. | |
| 8,009,296 B2 | 8/2011 | Sanders et al. | |
| 8,098,380 B2 * | 1/2012 | Sanders | G01C 19/727 356/461 |
| 8,213,019 B2 | 7/2012 | Strandjord et al. | |
| 8,223,341 B2 | 7/2012 | Strandjord et al. | |
| 8,259,301 B2 | 9/2012 | Strandjord et al. | |
| 8,294,900 B2 | 10/2012 | Strandjord et al. | |
| 9,354,064 B2 | 5/2016 | Strandjord et al. | |
| 9,587,945 B2 | 3/2017 | Strandjord et al. | |
| 2002/0051133 A1 | 5/2002 | Honda et al. | |
| 2003/0031415 A1 | 2/2003 | Gonthier et al. | |
| 2007/0133003 A1 | 6/2007 | Sanders et al. | |
| 2007/0242276 A1 | 10/2007 | Hughes et al. | |
| 2012/0133923 A1 | 5/2012 | Lefevre et al. | |
| 2012/0281225 A1 | 11/2012 | Digonnet et al. | |
| 2012/0281226 A1 | 11/2012 | Digonnet | |
| 2012/0281954 A1 * | 11/2012 | Kreuzer | C03C 25/106 385/102 |
| 2013/0271770 A1 | 10/2013 | Sanders et al. | |
| 2014/0029011 A1 | 1/2014 | Digonnet et al. | |
| 2014/0044142 A1 | 2/2014 | Strandjord et al. | |
| 2015/0022818 A1 * | 1/2015 | Lloyd | G01C 19/721 356/460 |
| 2015/0369605 A1 | 12/2015 | Strandjord et al. | |
| 2016/0003619 A1 | 1/2016 | Strandjord et al. | |
| 2016/0084654 A1 | 3/2016 | Senkal et al. | |
| 2016/0146607 A1 | 5/2016 | Celikel | |

FOREIGN PATENT DOCUMENTS

| | | |
|---|---|---|
| EP | 2701250 | 2/2014 |
| JP | 2009047684 A | 3/2009 |
| JP | 2010210617 A | 9/2010 |

OTHER PUBLICATIONS

European Patent Office, "Extended European Search Report from EP Application No. 15164566.0 dated Dec. 3, 2015", "From Foreign Counterpart of U.S. Appl. No. 14/325,006", dated Dec. 3, 2015, pp. 1-7, Published in: EP.

U.S. Patent and Trademark Office, "Notice of Allowance", "From U.S. Appl. No. 14/325,006", dated Feb. 2, 2016, pp. 1-21, Published in: US.

Sanders et al., "Symmetric Three-Laser Resonator Fiber Optic Gyroscope", "U.S. Appl. No. 14/312,009, filed Jun. 23, 2014", , pp. 1-25, Published in: US.

Strandjord et al., "Resonantor Fiber Optic Gyroscope Employing Common Cavity Length Modulation Along With High Bandwidth Laser Stabilization", "U.S. Appl. No. 14/325,006, filed Jul. 17, 2014", , pp. 1-29, Published in: US.

Sanders et al., "Novel Polarization-rotating Fiber Resonator for Rotation Sensing Applications", "Fiber Optic and Laser Sensors VII", 1989, pp. 373-381, vol. 1169, Publisher: Proc. SPIE.

Strandjord et al., "Performace Improvements of a Polarization-Rotating Resonator", "Fiber Optic and Laser Sensors X", 1992, pp. 94-103, vol. 1975, Publisher: SIPE.

Wang et al., "Reduction of Polarization-Fluctuation Induced Drift in Resonator Fiber Optic Gyro by a Resonator With Twim 90 Degree Polarization-Axis Rotated Splices", "Optics Express", Jan. 14, 2010, pp. 1677-1683, vol. 18, No. 2.

Yu et al., "Improving Thermal Stability of a Resonator Fiber Optic Gyro Employing a Polarizing Resonantor", "Optics Express", Jan. 4, 2013, pp. 358-369, vol. 21, No. 1, Published in: CN.

European Patent Office, "Extended European Search Report from EP Application No. 15169513.7 dated Oct. 16, 2015", "From Foreign Counterpart of U.S. Appl. No. 14/526,300", dated Oct. 16, 2015, pp. 16, Published in: EP.

U.S. Patent and Trademark Office, "Office Action", "From U.S. Appl. No. 14/312,009", dated Apr. 7, 2016, pp. 1-24, Published in: US.

European Patent Office, "Communication under Rule 71(3) EPC", dated Apr. 15, 2016, pp. 1-35, Published in: EP.

US Patent and Trademark Office, "Notice of Allowance", "U.S. Appl. No. 14/312,009", dated Oct. 24, 2016, pp. 1-8, Published in: US.

European Patent Office; "Communication pursuant to Article 94(3) EPC from EP Application No. 10153389.1 dated Jul. 1, 2011"; from Foreign Counterpart of U.S. Appl. No. 12/565,510; pp. 1-4; dated Jul. 1, 2011; Published: EP.

European Patent Office; "Communication pursuant to Article 94(3) EPC from EP Application No. 10153389.1 dated Oct. 27, 2011"; from Foreign Counterpart of U.S. Appl. No. 12/565,510; pp. 1-4; dated Oct. 27, 2011; Published: EP.

European Patent Office; "European Search Report for EP Application No. 10153389.1 dated Apr. 6, 2011"; from Foreign Counterpart of U.S. Appl. No. 12/565,510; pp. 1-3; dated Apr. 6, 2011; Published: EP.

European Patent Office; "Extended European Search Report from EP Application No. 15169969.1 dated Oct. 26, 2015"; from Foreign Counterpart of U.S. Appl. No. 14/312,009; pp. 1-10; dated Oct. 26, 2015; Published: EP.

Japanese Patent Office; "Notice of Allowance from JP Application No. 2010-038195 dated Dec. 7, 2012"; from Foreign counterpart of U.S. Appl. No. 12/565,510; pp. 1-4; dated Dec. 17, 2012; Published: JP.

Japanese Patent Office; "Office Action from JP Application No. 2010-038195 dated Jul. 6, 2012"; from Foreign Counterpart of U.S. Appl. No. 12/565,510; pp. 1-4; dated Jul. 6, 2012; Published: JP.

U.S. Patent and Trademark Office; "Notice of Allowance"; U.S. Appl. No. 12/565,510; pp. 1-12; Published: US.

U.S. Patent and Trademark Office; "Office Action"; U.S. Appl. No. 12/565,510; pp. 1-9; Published: US.

* cited by examiner

SMALL LOW COST RESONATOR FIBER OPTIC GYROSCOPE WITH REDUCED OPTICAL ERRORS

CROSS-REFERENCE TO RELATED APPLICATIONS

This application claims the benefit of U.S. Provisional Patent Application Ser. No. 62/014,662, filed on Jun. 19, 2014, which is hereby incorporated herein by reference.

BACKGROUND

There is a need for a small, low cost, navigation grade gyroscope for commercial navigation applications. Among the optical gyroscope technologies the resonator fiber optic gyroscope (RFOG) could potentially satisfy those needs by providing better signal to noise sensitivity to rotation rate measurement than the existing interferometric fiber optic gyroscope (IFOG) and the ring laser gyroscope (RLG).

While RFOGs have many advantages over other types of gyroscopes, they still have some issues. One major issue in RFOGs is bias instability, which is a variation in measured rotation rate, or a variation in indicated rotation rate by the gyroscope when the gyroscope is actually not rotating. One source of bias instability is due to light being in the wrong polarization state. Conventional implementations have tried to solve the problem of light being in the wrong polarization state and the temperature dependent errors that occur in PM fibers; however, in trying to solve these problems, conventional implementations have introduced other issues, such as more loss in the resonator (higher gyroscope noise), more assembly cost, larger size, and more imperfections via splices and fiber couplers that introduce performance issues like backscatter and residual polarization errors that limit performance or increase manufacturing tolerance stringency. Moreover, when conventional implementations introduce a large number of splices the ability to use hollow core fiber is diminished, which the use thereof eliminates other error terms. Fusion splices in hollow core fiber are very lossy and mechanical splices are lossy and costly. Each of the above problems in conventional implementations will be discussed in more detail below, along with how the embodiments in the current disclosure solve the above problems.

For the reasons stated above and for the reasons stated below which will become apparent to those skilled in the art upon reading and understanding the specification, there is a need in the art for improved systems and methods for improving the bias instability of RFOGs.

SUMMARY

The embodiments of the present disclosure provide systems and method for a small low cost resonator fiber optic gyroscope with reduced optical errors.

In one embodiment, a resonator fiber optic gyroscope comprises: at least one tunable light source configured to emit a clockwise optical signal and a counterclockwise optical signal; an optical chip configured to receive the clockwise optical signal and the counterclockwise optical signal, wherein the optical chip couples the clockwise optical signal and the counterclockwise optical signal from the at least one tunable light source into a fiber optic resonator and couples the clockwise optical signal and the counterclockwise optical signal from the fiber optic resonator to at least one photodetector. The fiber optic resonator comprises a fiber optic coil having a first end point and a second end point, wherein the fiber optic coil has a 90-degree splice located substantially half-way between the first end point and the second end point, wherein the fiber optic coil is wrapped around a first fiber stretcher that is located between the first end point and the 90-degree splice, and wherein the fiber optic coil is wrapped around a second fiber stretcher that is located between the second end point and the 90-degree splice; and the at least one photodetector configured to sample the clockwise optical signal and the counterclockwise optical signal.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
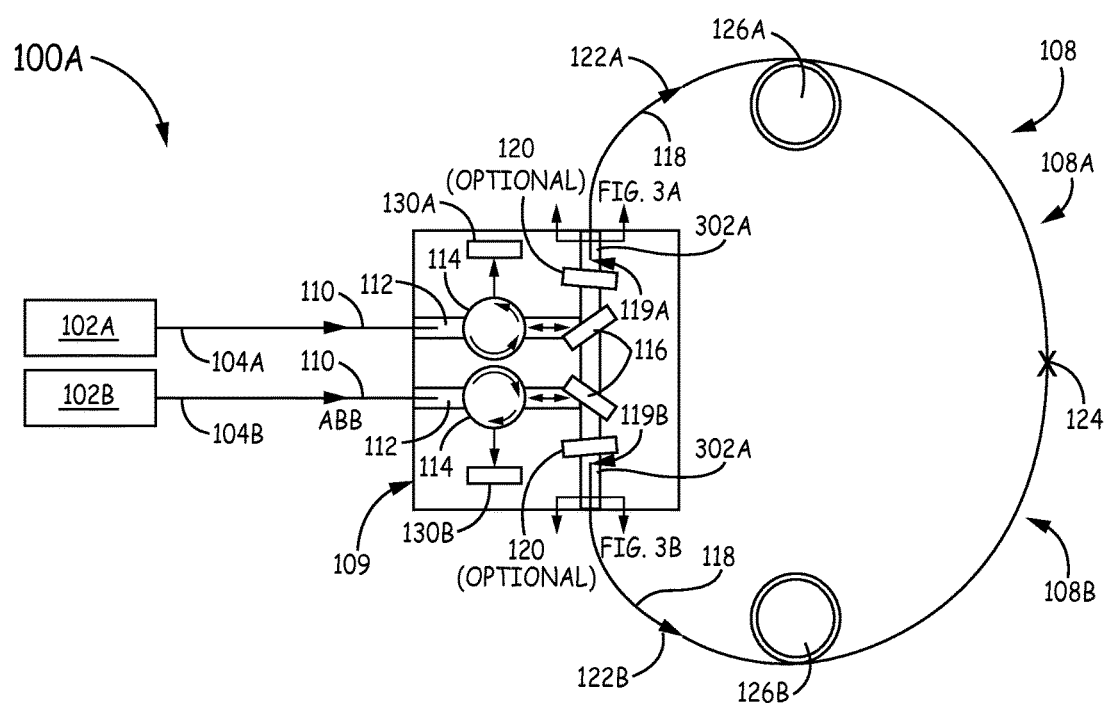
FIGS. 1A-1C are a block diagram of example RFOGs.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Generally, RFOGs work by measuring the resonance frequency shift of a ring resonator between two counter-propagating light waves that are directed to propagate within the ring resonator. More specifically, a ring resonator in a RFOG is formed using a fiber optic coil and at least one coupler to couple light from a beam generating device into and out of the resonator in the clockwise (CW) and the counterclockwise (CCW) directions. The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all the light-waves that have traversed the coil a different number of times interfere constructively at any point in the coil. As a result of this constructive interference, an optical wave having a wavelength $\lambda$ is referred to as "on resonance" when the round trip resonator path-length is equal to an integral number of wavelengths. A rotation about the axis of the coil produces different path-lengths for CW and CCW propagation, thus producing a shift between the respective resonance frequencies of the resonator. The frequency difference, and therefore the rotation rate of the resonator coil, can be measured by tuning the CW beam and CCW beam frequencies to match the resonance frequency shift of the closed optical path due to rotation.

As stated above, bias instability is a major issue for RFOGs. One of the major causes of bias instability in RFOGs is that there are two different polarization states of light, called polarization eigenstates, that can propagate within the resonator sensing loop used to measure rotation. In a conventional RFOG, or the general case of an RFOG, the two polarization eigenstates of the resonator have different round trip path-lengths, so only one, and the same one is probed in each direction, to measure the resonance frequencies of the resonator and determine rotation rate. If the input light in each input direction does not entirely couple into only one resonant eigenstate of the resonator, optical errors can be produced that cause bias instability. An eigenstate of polarization is a polarization state which reproduces itself after propagating around the resonator coil. Within an RFOG, there are components that cause cross coupling between different polarization axes of the fiber, which in turn, alters the polarization eigenstates of the resonator. For example, if eigenstates 1 and 2 originally reside completely on the two principal axes of the fiber, say the x and y-axes respectively, and the x-axis light (eigenstate 1) is used for rotation sensing, the fiber optic couplers, splices within the optical fiber coil of the resonator, and scattering within the optical fiber itself in the resonator can cross couple light from the two axes of the fiber and then the eigenstates 1 and 2 are no longer aligned with the x- and y-axes of the fiber. In this example, the eigenstates of polarization within the resonator changes as a result of a combination of light cross coupling between the two axes of the fiber and thermal fluctuations, it is difficult to entirely match a light wave into just one polarization eigenstate of the resonator (hereby referred to as "polarization state" or "polarization state of the resonator"). Furthermore, when light is in an undesired polarization state, the error it causes drifts over temperature due to changes in the fiber's birefringence (a measure of the index difference for light propagating on two different axes of the fiber), so one is unable to compensate for the error due to the undesired polarization state.

Figure 1B:
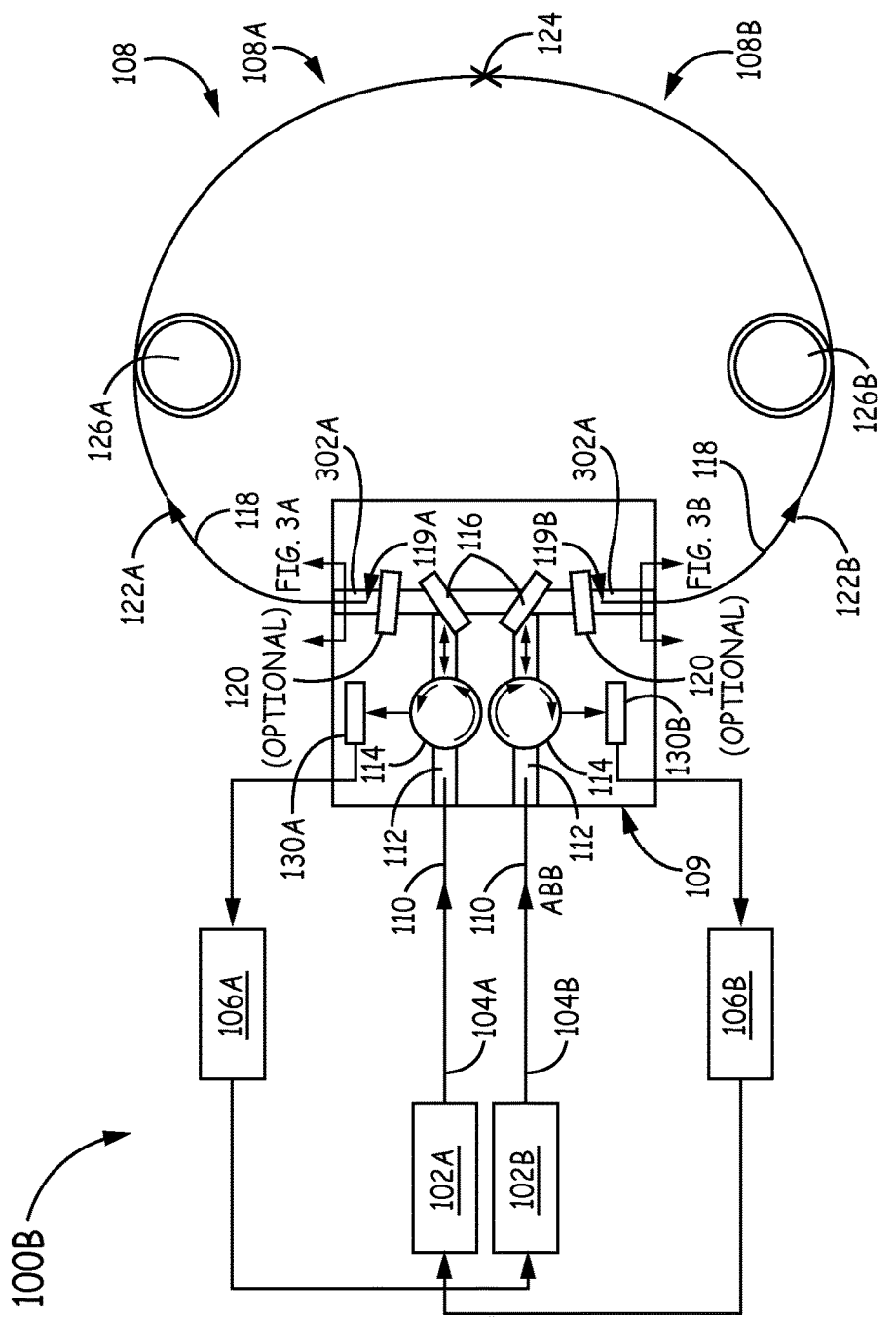
Figure 1C:
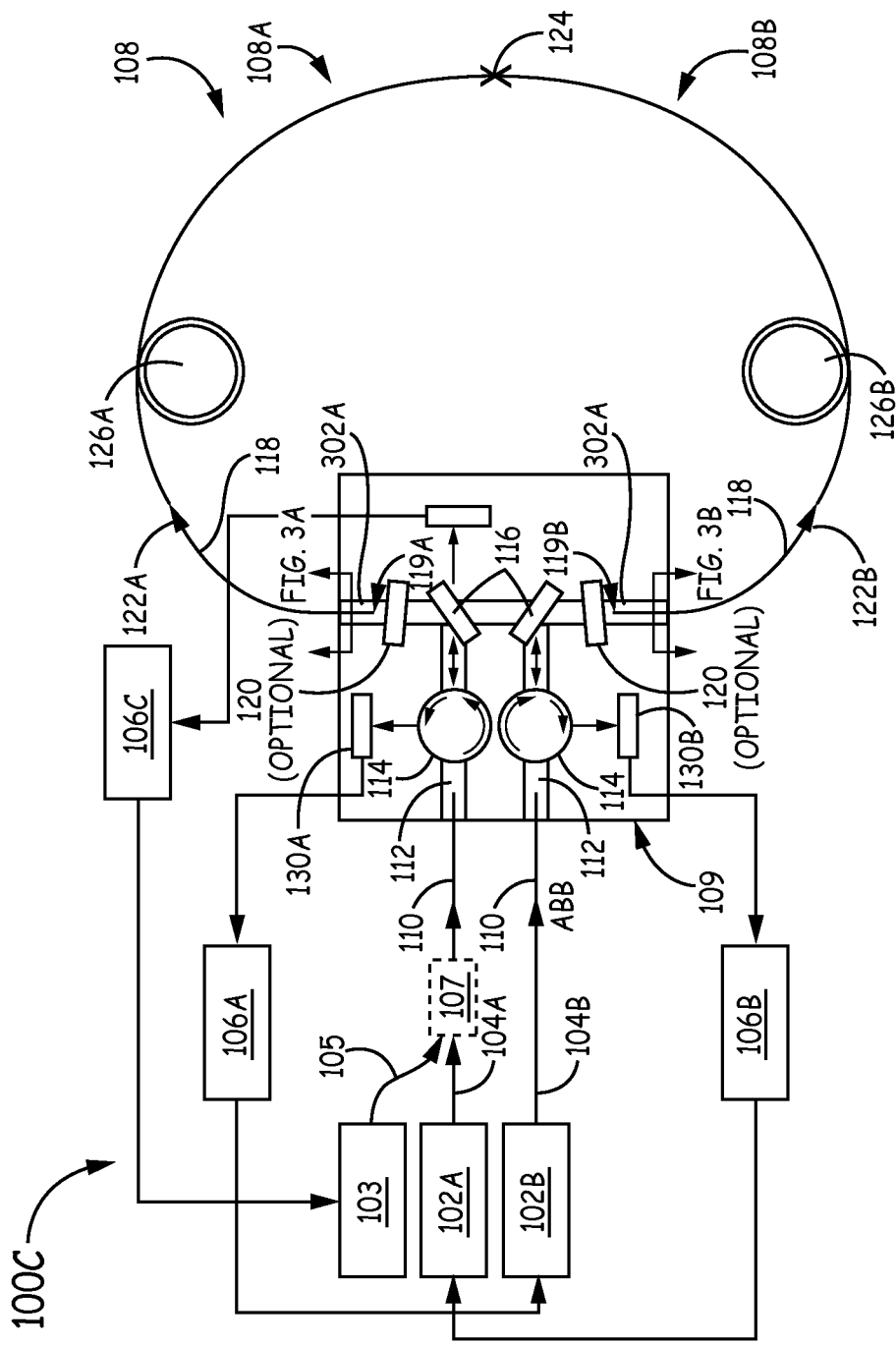

FIGS. 1A-1C are block diagrams of example RFOGs 100A-100C. The general operation of RFOGs 100A-100C is described above. That is, RFOGs 100A-100C work by measuring the resonance frequency shift of a ring resonator 108 between two counter-propagating light waves 122A, 122B that are directed to propagate within the ring resonator 108. The components that complete the operation of RFOGs 100A-100C, while solving the problems described above in conventional implementations, are described in greater detail below. Elements labeled with the same number in different Figures function similarly to one another.

The RFOG 100A comprises tunable light sources 102A, 102B (e.g., tunable lasers, laser diodes, optical frequency comb, or other suitable tunable light sources) that synthesize tunable light beams 104A, 104B, respectively. Tunable light sources 102A, 102B and tunable light beams 104A, 104B will be referred to herein as light sources 102A, 102B and light beams 104A, 104B, respectively. In some embodiments, the tunable light sources 102A, 102B can comprise two light sources. In other embodiments, there can be more or less light sources 102A, 102B. In an example, a first light source 102A tunes a light beam 104A to have a frequency $f_1$ and a second light source 102B tunes a light beam 104B to have a frequency $f_2$.

Preferably, the relative frequency drift and jitter between the two light frequencies $f_1$ and $f_2$ is substantially reduced to a level that reduces or does not affect the accuracy and stability of the frequency shift, and thus rotational rate, measurement. This can be accomplished by locking the light frequencies $f_1$ and $f_2$ to the resonance frequencies of the resonator 108 with servos 106A, 106B as shown in FIG. 1B In some embodiments, to further increase stabilization, there can also be a master light source 103 that is stabilized to a reference resonance at a frequency $f_0$, using a servo 106C, which is different than the resonant frequencies $f_1$ and $f_2$ of the resonator 108 as shown in FIG. 1C. The light beam 105 from the master tunable light source 103 can be combined with one or both of the light beams 104A and 104B from the tunable light sources 102A, 102B (called "slave lasers"). In this example, the light beam 105 from the master tunable light source 103 is combined with the light beam 104A from the light source 102A using a coupler 107. Each tunable light source that is slaved by phase locking, with a tunable offset frequency shift, to the light produced by the master tunable light source 103 may have an associated feedback control that receives a signal from a photo-detector associated with a particular transmission port and adjusts the tunable frequency shift to center slave lasers 102A and 102B to the centers of CW and CCW resonances. For example, when the RFOG 100 has two tunable light sources 102A and 102B; one or both of the lasers that propagates in the resonator 108 may be circulated toward one of the photo-detectors 130A and 130B, where the photo-detector 130A, 130B provides a signal to the feedback control for the tunable light sources 102A and 102B that propagate in the resonator 108.

Figure 2:
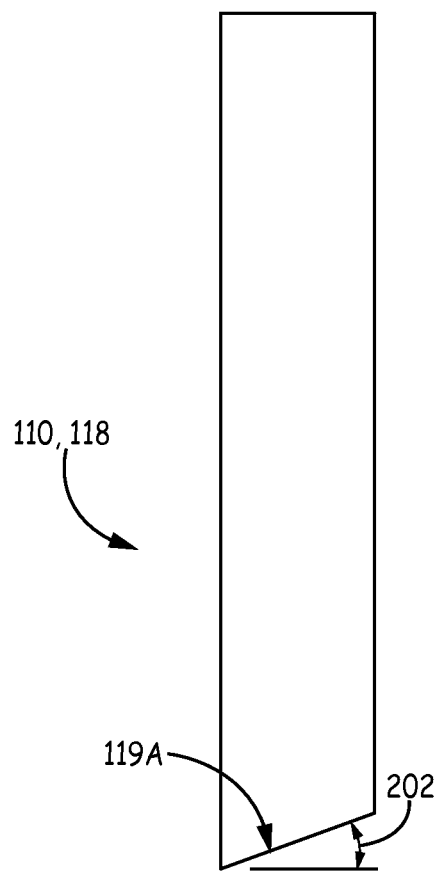
FIG. 2 is a block diagram of an example of an angle-cleaved optical fiber.

The light beams 104A, 104B generated by the light sources 102A, 102B are coupled to an optical chip 109. In some embodiments, the light beams 104A, 104B can be coupled from the light sources 102A, 102B to the optical chip 109 using an optical fiber 110. In some embodiments, once the light beams 104A, 104B enter the optical chip 109, the optical chip 109 can contain waveguides or free space optical path 112 for guiding the light beams 104A, 104B within the optical chip 109. In exemplary embodiments, the ends points (also referred to herein as "ends") of the optical fiber 110 can be angle-cleaved as shown in FIG. 2. In exemplary embodiments, the angle 202 at which the optical fiber 110 is angle-cleaved can be 8 degrees or higher. In other embodiments, the angle 202 at which the optical fiber 110 is angle-cleaved can be angles 202 less than 8 degrees. The purpose of angle-cleaving the ends of the optical fiber 110 is to reduce the backscatter reflection that couples back into the fiber waveguide in the opposite direction that results due to transitioning from a first material having a first index of refraction to a second material having a second index of refraction that is different than the first index of refraction. In this example, the glass in the optical fiber 110 has an index of refraction of roughly 1.47 and the index of refraction of the free space in the optical path 112 is roughly 1.00. By angle-cleaving the optical fiber 110, the back-reflection into the optical fiber 110, which is roughly 4% in this example without the angle-cleaving, is significantly reduced. In addition, the optical fiber 110 also may be anti-reflection (AR) coated to further reduce back-reflected light, either in combination with an angle cleave or with a standard non-angle cleaved endface. It is also possible to put high index coatings around the tip of the optical fiber 110 to make sure that light that is back-reflected into the cladding at an angle (due to the angle cleave) is fully absorbed out of the optical fiber 110 and never is able to propagate back into the core of the optical fiber 110.

Once the light beams 104A, 104B enter the optical chip 109, the waveguides 112 guide the light beams 104A, 104B within the optical chip 109. First, the waveguides 112 guide the light beams 104A, 104B to optical circulators 114. In exemplary embodiments, the optical circulators 114 can have a vertical pass-axis, which polarizes the light beams 104A, 104B in the vertical direction. In other embodiments, the optical circulators 114 can have a pass-axis in a different orientation than vertical or not have a pass-axis at all, which in this case, the optical circulators 114 will pass light with various orientations. In other embodiments, there is no waveguide on optical chip 109; rather, the light beams 104A, 104B travel in free space above the chip surface from fiber to components like circulator 114, partially reflective mirror 116, and polarizers 120.

In addition to polarizing the light beams 104A, 104B, the optical circulators 114 can direct the light beams 104A, 104B to a coupling device 116 that couples the light beams 104A, 104B into the resonator 108. In exemplary embodiments, the coupling devices 116 are weakly-reflective mirrors 116 that are angled to direct the light from the optical circulators 114 into the fiber optic coil 118 of the resonator 108. In other embodiments, the coupling devices 116 are fiber optic couplers, waveguides, or other suitable components. In certain implementations, weakly-reflective mirrors may be preferred over other types of coupling devices because other types of couplers can introduce cross-coupling between different polarizations. For example, fiber optic couplers can introduce a cross coupling of about 1% of the light between polarizations of the fiber within the coupler, which can degrade the accuracy of the RFOG 100. The circulators 114 also couple light 122A, 122B from the resonator 108 to photodetectors 130A-130C where the photodetectors 130A-130C sample the light 122A-122C from resonator. Embodiments that utilize servos 106A-106C can couple the light received by the photodetectors 130A-130C to tune the frequencies of $f_1$, $f_2$, $f_0$ of the light sources 102A, 102B, 103, respectively.

As mentioned above, the light beams 104A, 104B are coupled from the optical chip 109 to the resonator 108 by coupling devices 116. In exemplary embodiments, however, polarizers 120 can be included in the optical chip 109 between the coupling devices 116 and the fiber optic coil 118 of the resonator 108. In exemplary embodiments, the polarizers 120 can have a vertical pass-axis, antireflective coating and a slight angle relative to normal incidence. In other embodiments, the polarizers 120 can have a different pass-axis than vertical.

Figure 3A:
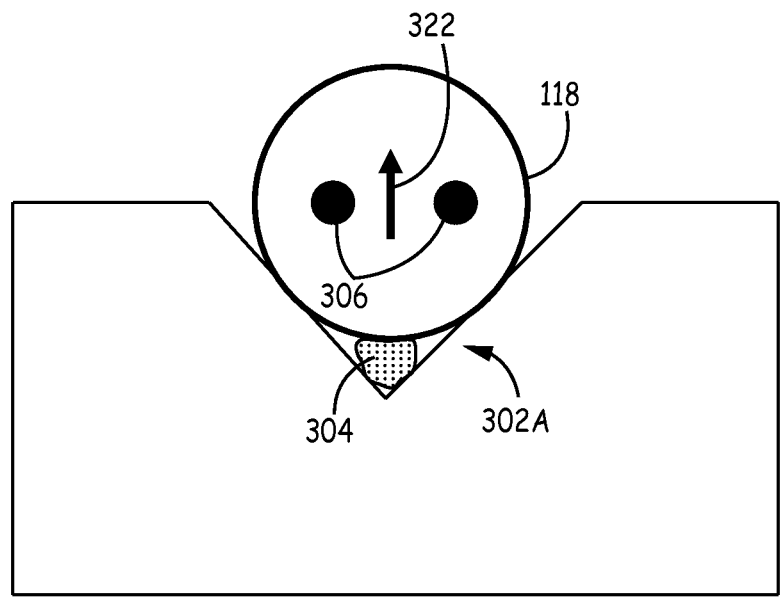
FIGS. 3A-3B are block diagrams of side-view.
Figure 3B:
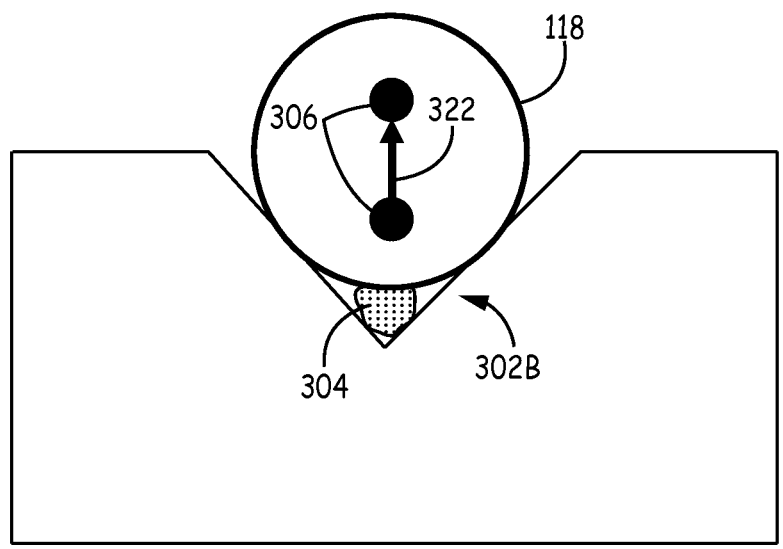

After the light beams 104A, 104B pass through the polarizers 120, they enter the fiber optic coil 118 of the resonator 108. In exemplary embodiments, the fiber optic coil 118 is a polarization maintaining (PM) fiber and has a first end point 119A and a second end point 119B. The first end point 119A and the second end point 119B will also be referred to herein as "ends". Moreover, in exemplary embodiments, the ends of the fiber optic coil 118 can be angle-cleaved at 8 degrees or higher as discussed above and shown in FIG. 2. In other embodiments, the ends of the fiber optic coil 118 can be angle-cleaved at other angles. If the fiber is solid core fiber, it can also be anti-reflection (AR) coated to reduce back-reflections. Similar to above, angle-cleaving the ends of the fiber optic coil 118 will prevent reflection back into the waveguide 112 of the optical chip 109, or more importantly, prevent back-reflection of light from one direction of propagation in the resonator into the other direction. Note that hollow core fiber can also be used in this invention and angle-cleaving its endfaces can reduce back-reflections. Moreover, in exemplary embodiments, the ends of the fiber optic coil 118 can be secured within V-grooves 302A, 302B on the optical chip 109 using an adhesive 304, such as an epoxy 304, as shown in FIGS. 3A-3B. In the case of hollow core fiber, care must be taken to secure the endfaces in the vee-groove without the adhesive wicking into the hollow core of the fiber and ruining its light guidance properties.

FIGS. 3A-3B are side-views of V-grooves 302A, 302B fabricated on the optical chip 109. As stated above, in exemplary embodiments, the fiber optic coil 118 is a PM fiber. As is known, PM fibers have a fast axis and a slow axis. Light travelling along one axis in the PM fiber is of one polarization state of the fiber, and in the current disclosure, in one polarization eigenstate of the resonator at a given point along the fiber length. The light travelling along the other axis at the same point along the fiber length is travelling in the other polarization state of the PM fiber and in the orthogonal eigenstate of polarization of the resonator. Ideally, PM fibers preserve the polarization of the light on the two axes. As a result, if a beam of light is launched along one axis, the light should stay in that axis with the corresponding polarization. The fast axis and the slow axis in the PM fiber are created by putting stress rods 306 in the PM fiber. The stress rods create birefringence in the fiber optic coil 118, which changes the speed of light on one axis versus the other axis due to the axes having different indexes of refraction. Light that has a polarization perpendicular to the plane of the stress rods 306 is travelling along the fast axis, while light that has a polarization parallel to the plane of the stress rods 306 is travelling along the slow axis. In FIG. 3A, the light 322 has a vertical polarization and since the light 322 has a polarization perpendicular to the plane of the stress rods 306, the light is travelling along the fast axis of the PM fiber 118. In FIG. 3B, the light 322 has a vertical polarization, which is parallel to the plane of the stress rods 306; and therefore, the light 322 in FIG. 3B is travelling in the slow axis of the PM fiber 118. In exemplary embodiments, the plane of the stress rods 306 in the fiber optic coil 118 is parallel to the surface of the optic chip 109 and perpendicular to the polarization of the light 322 in the V-groove 302A; further, the plane of the stress rods 306 in the fiber optic coil 118 is perpendicular to the surface of the optic chip 109 and parallel to the polarization of light 322 in the V-groove 302B due to the 90 degree splice 124 in the fiber optic coil 118, which is explained in more detail below.

Since PM fibers have two different axes with two different indexes of refraction, not only is the propagation constant different in the two different axes, but also, the change of the propagation constant as a function of temperature and stress in each axis is different. This impacts the relative resonance frequencies of the two polarization eigenstates of the RFOG 100A-100C and degrades performance of the RFOG 100A-100C as temperature or stress fluctuates. To counter the temperature dependence problem found in some conventional implementations, the fiber optic coil 118 has a 90-degree splice 124 inserted into the fiber optic coil 118. In exemplary embodiments, the 90-degree splice 124 is inserted at the midpoint of the fiber optic coil 118. However, in some embodiments, the 90-degree splice 124 can be inserted approximately at the midpoint of the fiber optic coil 118. Due to this 90-degree splice 124 in the fiber optic coil 118, the light beams 104A, 104B spend equal amounts of time on the fast axis and the slow axis. As an example, the light wave in the desired polarization eigenstate of the resonator that is used in CW and CCW directions to measure rotation is propagating on the fast axis that can be represented by the top portion 108A of the resonator 108 and the slow axis that can be represented by the lower portion 108B of the resonator 108. Therefore, CW travelling light 122A will be travelling in the fast axis while in the top portion 108A of the resonator 108. Once the CW light 122A passes through the 90-degree splice 124 and into the lower portion 108B of the resonator 108, the light 122A will be in the slow axis of the resonator fiber 118 within resonator 108. As a result, the temperature dependence of the RFOG is reduced.

While introducing a 90-degree splice 124 into the fiber optic coil 108 has the advantage of reducing the temperature dependence of the fiber optic coil 118, the 90-degree splice 124 adds an additional problem if it were not for the orthogonally oriented fiber ends as shown in FIGS. 3A and 3B. Namely, when a 90-degree splice is inserted into the fiber optic coil 118 without the orthogonally oriented ends, the polarization eigenstates of the resonator will have equal amounts of light on the two axes of the fiber and along its length of the fiber the eigenstates will vary between being circular polarized, to elliptically polarized, to 45 degree linearly polarized, to elliptically polarized and back to circularly polarized. The input light beams 104A, 104B would no longer couple correctly into one resonator polarization eigenstate if they were linearly polarized. Instead, the light beams 104A, 104B would have to equally excite the two eigenstates. For example, if injected light beams 104A, 104B were x-axis polarized light, it would excite two resonances within the resonator of equal size. Therefore, while the 90-degree splice 124 reduced the temperature dependence of the RFOG 100A-100C, there is now (as-sumed to be without the orthogonally oriented fiber ends of FIGS. 3A and 3B) a polarization eigenstate of the resonator which is not linearly polarized along one axis of the coil fiber 118 which makes it difficult to match the input light beams 104A, 104B into only one polarization eigenstate of the resonator 108.

Some conventional implementations try to solve the temperature dependence problem by introducing two 90-degree splices. As a result, light spends an equal amount of time in the slow axis and an equal amount of time on the fast axis, so the temperature dependence is averaged out. In addition, two 90-degree splices enable the polarization eigenstates within the ring to be substantially linear states, and thus are easier to match into. However, this implementation has drawbacks with one being the precision of where the 90-degree splices are placed within the fiber optic coil need to be extremely accurate, so that the light is actually spending an equal amount of time in the slow axis and the fast axis, and that small deviations in splice angle from 90 degrees can significantly degrade the gyro accuracy. Also, this implementation does not have a symmetric input/output architecture, which can introduce errors as well.

To solve the unwanted polarization, some conventional implementations have introduced polarizers into the fiber optic coil. However, this implementation introduces additional problems. For example, one problem with introducing polarizers into the fiber optic coil is that the loss in the fiber optic resonator increases. As a result, the signal to noise ratio in the gyro decreases. Moreover, by introducing polarizers into the fiber optic coil, more 0-degree splices are required.

The other problem with conventional implementations that add in two 90-degree splices into the fiber optic coil or that add in polarizers that require 0-degree splices to be inserted into the fiber optic coil is that at each splice backscattered light can result, which increases the chances of getting double backscattered light from a pair of splices or polarizers, or splice-polarizer pair. Double backscatter causes additional problems for RFOGs because it regenerates light in the forward direction that causes bias instability.

To get rid of double back scatter, the embodiments in this disclosure introduce fiber stretchers 126A, 126B into the fiber optic coil 118. In exemplary embodiments, the fiber stretchers 126A, 126B are PZT cylinders. Moreover, in exemplary embodiments, fiber stretchers 126A, 126B are introduced into the fiber optic coil 118 between each pair of potential backscattering sites (i.e., between each set of the splices), so the backscatter can be randomized. However, for conventional implementations, introducing fiber stretchers 126A, 126B at each pair of potential backscattering sites is unrealistic because of the greater number of splices that conventional implementations entail. Each fiber stretcher 126A, 126B also adds size and cost to the RFOG 100A-100C.

To randomize the backscatter, the fiber stretchers 126A, 126B may provide a proper path-length change so that the phase modulation amplitude is 2.4 radians, corresponding to the first null of Bessel function $J_o$ (or a higher modulation amplitude corresponding to another null of the Bessel function $J_o$) between the initial light 122A, 122B and the double-backscattered light. The 2.4 radians is calculated as follows. The interference of the two waves (i.e., the initial light 122A, 122B and the double back scattered light) can be expressed as follows:

$$I = E_1^2 + E_2^2 + 2E_1E_2 \cos[\varphi(t)] \quad (1)$$

where I is the resulting light intensity of the two interfering waves, $E_1$ is the electric field amplitude of the first (CW or CCW) primary or signal wave, $E_2$ is the electric field amplitude of the second, or parasitic wave (CW or CCW), and $\varphi(t)$ is the relative phase between the two waves. The relative phase is shown to be a function of time, but also could be expressed as a function of temperature or some other environmental parameter that varies in time.

Equation (1) can be rewritten as $$I = E_1^2 + E_2^2 + 2E_1E_2 \cos[\varphi(t) + \theta_a \sin(\omega_m t)] \quad (2)$$

Using trigonometric identities Equation 2 can be rewritten as $$I = E_1^2 + E_2^2 + 2E_1E_2 \{\cos[\varphi(t)] \cos[\theta_a \sin(\omega_m t)] - \sin[\varphi(t)] \sin[\theta_a \sin(\omega_m t)]\} \quad (3)$$

The trig functions $\cos[\theta_a \sin(\omega_m t)]$ and $\sin[\theta_a \sin(\omega_m t)]$ can be expressed as an infinite series of Bessel functions, $$\cos[\theta_a \sin(\omega_m t)] = J_0(\theta_a) + 2\sum_{n=1}^{\infty} J_{2n}(\theta_a)\cos[2n\omega_m t] \quad (4)$$

$$\sin[\theta_a \sin(\omega_m t)] = 2\sum_{n=1}^{\infty} J_{2n-1}(\theta_a)\sin[(2n-1)\omega_m t] \quad (5)$$

In Equations 4 and 5 one can see all the terms in the two infinite series except for one will be varying at $\omega_m$ or some multiple integer of $\omega_m$. Therefore if the cavity modulation frequency $\omega_m$ is set high enough, all the terms except for one, the term $J_o(\theta_a)$, will vary at a sufficiently high enough frequency to be out of the band of interest and thus can be filtered out. The remaining term, $J_o(\theta_a)$, can be reduced by setting the cavity modulation amplitude $\theta_a$ to an appropriate value. $J_o(\theta_a)$ passes through zero at about a phase modulation amplitude of 2.4 radians, again at about 5.5 radians and then again at about 8.6 radians. The closer the phase modulation amplitude is made to one of these nulls the smaller the gyroscope sensing error. Therefore, as a result of the fiber stretchers 126A, 126B being chosen for the appropriate path-length, the backscatter error that results in conventional implementations is reduced.

Figure 4:
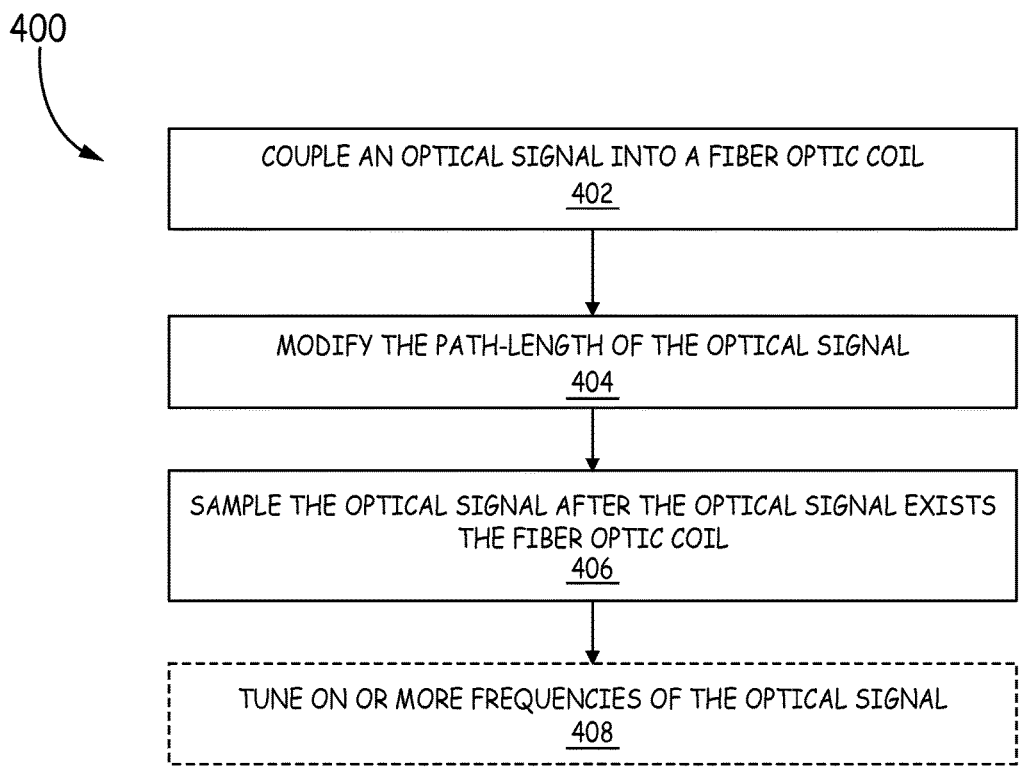
FIG. 4 is a flow diagram of an example method for reducing the bias instability in a resonator fiber optic gyroscope.

FIG. 4 is a flow diagram of an example method 400 for reducing the bias instability in a resonator fiber optic gyroscope. The method 400 includes coupling at least one optical signal into a fiber optic coil of a fiber optic resonator, wherein after the at least one optical signal is coupled into the fiber optic coil, the at least one optical signal transitions once from propagating along a fast axis of the fiber optic coil to a slow axis of the fiber optic coil (block 402). Furthermore, the at least one optical signal spends a substantially equal amount of time propagating along the fast axis and the slow axis of the fiber optic coil. In some embodiments, the fiber optic coil and the fiber optic resonator can include any of the embodiments discussed above. Furthermore, in some embodiments, an optical signal can be coupled into the fiber optic coil of a fiber optic resonator in any of the ways discussed above. For example, in some embodiments, the at least one optical signal can be coupled into the fiber optic coil using at least one weakly reflective mirror.

Method 400 further comprises modifying the path-length of the at least one optical signal such that the phase modulation amplitude between the at least one optical signal and a double-backscattered optical signal is substantially 2.4 radians (block 404). In some embodiments, the path-length of the at least one optical can be modified in any of the ways discussed above. For example, the path-length of the at least one optical signal can be modified using at least one fiber stretcher. The fiber stretch can be a PZT cylinder.

Method 400 further comprises sampling at least one optical signal after the at least one optical signal exits the fiber optic resonator. Similar to above, in some embodiments, the at least one optical signal can be sampled using any of the ways discussed above. For example, the at least one optical signal can be sampled using a photodetector.

Furthermore, in some embodiments, method 400 may include tuning one or more frequencies of the at least one optical signal based on the sampling of the at least one optical signal (block 408). In some embodiments, this can be done using any of the ways discussed above. For example, in some embodiments, servos can be used to couple the light received by one or more photodetectors to tune the frequencies of the light sources that produce that at least one optical signal.

As a result of the embodiments described in this disclosure, the temperature dependence of RFOGs 100A-100B is reduced; the embodiments are smaller and lower cost than in conventional implementations due to having fewer splices and requiring fewer fiber stretchers 126A, 126B; the polarization error that results from splices are managed; and, the backscatter problems that occur in conventional implementations are reduced.

Stated another way, the embodiments in this disclosure solves the problems above by treating polarization errors without introducing a lot of unfavorable side effects such as backscattering within the fiber resonator, or tighter tolerances on 1) the 90-degree splice alignment or zero-degree splice alignment, 2) or coupler imperfections, 3) splice loss, 4) and backscattering errors by reducing the number of splices in the fiber coil to just one. By reducing the number of splices, the cost of manufacturing is also reduced since each splice can require a cost that is significant to the gyroscope. The embodiments of this disclosure manages polarization error by attenuating the light on the unwanted axis of an individual segment of fiber by using a polarizer on a chip, which is lower cost than a fiber polarizer or a fiber pigtailed bulk optic polarizer. Plus, any back-reflection errors from the polarizer (unlike if it was embedded in the fiber loop like conventional implementations) can be greatly reduced by tilting them and by the use of the same fiber stretchers 126A, 126B that eliminate errors from back-reflections from the fiber end faces, and by the fact that the two polarizers are in such close proximity. The close proximity of the two backscattering surfaces (polarizers on the optical chip) reduces changes in path-length between them that is subject to thermal variation, which can, in turn, drive gyro errors. Thus, in some embodiments, only two fiber stretchers 126A, 126B are needed to eliminate backscatter errors in this design. In addition, fiber couplers, which are sources of polarization cross-coupling and thus increase polarizer extinction requirements and precision of the 90 splice alignment and loop-location, are eliminated. This also reduces cost and size.

EXAMPLE EMBODIMENTS

Example 1 includes a resonator fiber optic gyroscope comprising: at least one tunable light source configured to emit a clockwise optical signal and a counterclockwise optical signal; an optical chip configured to receive the clockwise optical signal and the counterclockwise optical signal, wherein the optical chip couples the clockwise optical signal and the counterclockwise optical signal from the at least one tunable light source into a fiber optic resonator and couples the clockwise optical signal and the counterclockwise optical signal from the fiber optic resonator to at least one photodetector; the fiber optic resonator comprising a fiber optic coil having a first end point and a second end point, wherein the fiber optic coil has a 90-degree splice located substantially half-way between the first end point and the second end point, wherein the fiber optic coil is wrapped around a first fiber stretcher that is located between the first end point and the 90-degree splice, and wherein the fiber optic coil is wrapped around a second fiber stretcher that is located between the second end point and the 90-degree splice; and the at least one photodetector configured to sample the clockwise optical signal and the counterclockwise optical signal.

Example 2 includes the resonator fiber optic gyroscope of Example 1, wherein the fiber optic coil is a polarization maintaining fiber optic coil.

Example 3 includes the resonator fiber optic gyroscope of Example 2, wherein an optical signal propagating between the first end point and the 90-degree splice propagates substantially on the fast-axis of the polarization maintaining fiber and an optical signal that propagates between the second end point and the 90-degree splice propagates substantially on the slow-axis of the polarization maintaining fiber.

Example 4 includes the resonator fiber optic gyroscope of any of Examples 1-3, wherein the fiber optic coil is a solid core optical fiber.

Example 5 includes the resonator fiber optic gyroscope of Example 4, wherein the first end of the solid core optical fiber or the second end of the solid core optical fiber or both are angle cleaved or anti-reflection coated or both.

Example 6 includes the resonator fiber optic gyroscope of any of Examples 1-5, wherein the fiber optic coil is a hollow core fiber.

Example 7 includes the resonator fiber optic gyroscope of Example 6, wherein the first end of the hollow core fiber or the second end of the hollow core fiber or both are angle cleaved.

Example 8 includes the resonator fiber optic gyroscope of any of Examples 1-7, wherein the first fiber stretcher and the second fiber stretcher are PZT cylinders.

Example 9 includes the resonator fiber optic gyroscope of any of Examples 1-8, wherein the first fiber stretcher and the second fiber stretcher change the path-length of an optical signal such that the modulation amplitude between the optical signal and a double-backscattered optical signal yields substantially a null of Bessel function $J_0$.

Example 10 includes the resonator fiber optic gyroscope of any of Examples 1-9, wherein the optical chip couples the clockwise optical signal and the counterclockwise optical signal into the fiber optic coil of the fiber optic resonator using at least one weakly reflective mirror.

Example 11 includes a fiber optic resonator, comprising: a fiber optic coil having a first end point and a second end point, wherein the fiber optic coil has a 90-degree splice located substantially half-way between the first end point and the second end point, wherein the fiber optic coil is wrapped around a first fiber stretcher that is located between the first end point and the 90-degree splice, and wherein the fiber optic coil is wrapped around a second fiber stretcher that is located between the second end point and the 90-degree splice.

Example 12 includes the fiber optic resonator of Example 11, wherein the fiber optic coil is a polarization maintaining fiber optic coil.

Example 13 includes the fiber optic resonator of Example 12, wherein an optical signal propagating between the first end point and the 90-degree splice propagates substantially on the fast-axis of the polarization maintaining fiber and an optical signal that propagates between the second end point and the 90-degree splice propagates substantially on the slow-axis of the polarization maintaining fiber.

Example 14 includes the fiber optic resonator of any of Examples 11-13, wherein the fiber optic coil is a solid core optical fiber and wherein the first end of the solid core optical fiber or the second end of the solid core optical fiber or both are angle cleaved or anti-reflection coated or both.

Example 15 includes the fiber optic resonator of any of Examples 11-14, wherein the fiber optic coil is a hollow core fiber and wherein the first end of the hollow core fiber or the second end of the hollow core fiber or both are angle cleaved.

Example 16 includes the fiber optic resonator of any of Examples 11-15, wherein the first fiber stretcher and the second fiber stretcher are PZT cylinders.

Example 17 includes the fiber optic resonator of any of Examples 11-16, wherein the first fiber stretcher and the second fiber stretcher modify the path-length of an optical signal such that the modulation amplitude between the optical signal and a double-backscattered optical signal yields substantially a null of Bessel function $J_0$.

Example 18 includes a method for reducing bias instability in a resonator fiber optic gyroscope, comprising: coupling at least one optical signal into a fiber optic coil of a fiber optic resonator, wherein after the at least one optical signal is coupled into the fiber optic coil, the at least one optical signal transitions once from propagating along a fast axis of the fiber optic coil to a slow axis of the fiber optic coil, and wherein the at least one optical signal spends a substantially equal amount of time propagating along the fast axis and the slow axis of the fiber optic coil; modifying the path-length of the at least one optical signal such that the modulation amplitude between the at least one optical signal and a double-backscattered optical signal yields substantially a null of Bessel function $J_0$; and sampling the at least one optical signal after the at least one optical signal exits the fiber optic resonator.

Example 19 includes the method of Example 18, wherein the path-length of the at least one optical signal is modified using at least one fiber stretcher.

Example 20 includes the method of any of Examples 18-19, wherein the at least one optical signal is coupled into the fiber optic coil using at least one weakly reflective mirror.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator fiber optic gyroscope comprising:
   at least one tunable light source configured to emit a clockwise optical signal and a counterclockwise optical signal;
   an optical chip configured to receive the clockwise optical signal and the counterclockwise optical signal, wherein the optical chip couples the clockwise optical signal and the counterclockwise optical signal from the at least one tunable light source into a fiber optic resonator and couples the clockwise optical signal and the counterclockwise optical signal from the fiber optic resonator to at least one photodetector on the optical chip, wherein a first coupling device couples the clockwise optical signal from the at least one tunable light source into and the counterclockwise optical signal out of the fiber optic resonator and a second coupling device couples the counterclockwise optical signal from the at least one tunable light source into and the clockwise optical signal out of the fiber optic resonator;
   the fiber optic resonator comprising a fiber optic coil having a first end point and a second end point, wherein the first and second coupling devices couple light between the first and second end points with substantially no polarization cross-coupling,
   wherein the fiber optic coil has a 90-degree splice located substantially half-way between the first end point and the second end point,
   wherein the fiber optic coil is wrapped around a first fiber stretcher that is located between the first end point and the 90-degree splice,
   wherein the fiber optic coil is wrapped around a second fiber stretcher that is located between the second end point and the 90-degree splice; and
   wherein the fiber optic coil is a polarization maintaining fiber optic coil and the first end point and the second end point are orthogonally oriented to one another, wherein an optical signal propagating between the first end point and the 90-degree splice propagates substantially on the fast-axis of the polarization maintaining fiber and an optical signal that propagates between the second end point and the 90-degree splice propagates substantially on the slow-axis of the polarization maintaining fiber; and
   the at least one photodetector configured to sample the clockwise optical signal and the counterclockwise optical signal.

2. The resonator fiber optic gyroscope of claim 1, wherein the fiber optic coil is a solid core optical fiber.

3. The resonator fiber optic gyroscope of claim 2, wherein the first end of the solid core optical fiber or the second end of the solid core optical fiber or both are angle cleaved or anti-reflection coated or both.

4. The resonator fiber optic gyroscope of claim 1, wherein the fiber optic coil is a hollow core fiber.

5. The resonator fiber optic gyroscope of claim 4, wherein the first end of the hollow core fiber or the second end of the hollow core fiber or both are angle cleaved.

6. The resonator fiber optic gyroscope of claim 1, wherein the first fiber stretcher and the second fiber stretcher are PZT cylinders.

7. The resonator fiber optic gyroscope of claim 1, wherein the first fiber stretcher and the second fiber stretcher change the path-length of an optical signal such that the modulation amplitude between the optical signal and a double-backscattered optical signal yields substantially a null of Bessel function J0.

8. The resonator fiber optic gyroscope of claim 1, wherein the first and second coupling devices each comprise a weakly reflective mirror.

9. A method for reducing bias instability in a resonator fiber optic gyroscope, comprising:
providing an optical chip configured to receive a clockwise optical signal and a counterclockwise optical signal from at least one tunable light source, the optical chip including a first coupling device, a second coupling device, and at least one photodetector;
coupling a plurality of optical signals from the at least one tunable light source into a fiber optic coil of a fiber optic resonator with the first coupling device and the second coupling device, wherein the first and second coupling devices couple light between a first end point of the fiber optic coil and a second end point of the fiber optic coil with substantially no polarization cross-coupling, wherein the fiber optic coil is a polarization maintaining fiber optic coil and the first end point and the second end point are orthogonally oriented to one another, wherein the fiber optic coil has a 90-degree splice located substantially half-way between the first end point and the second end point,
wherein after the plurality of optical signals are coupled into the fiber optic coil, each optical signal in the plurality of optical signals transitions once from one of propagating along a fast axis of the fiber optic coil to a slow axis of the fiber optic coil or propagating along a slow axis of the fiber optic coil to a fast axis of the fiber optic coil, wherein an optical signal in the plurality of optical signals propagating between the first end point and the 90-degree splice propagates substantially on the fast-axis of the polarization maintaining fiber and an optical signal in the plurality of optical signals that propagates between the second end point and the 90-degree splice propagates substantially on the slow-axis of the polarization maintaining fiber, and
wherein each of the plurality of optical signals spends a substantially equal amount of time propagating along the fast axis and the slow axis of the fiber optic coil;
modifying the path-length of the plurality of optical signals such that the modulation amplitude between the plurality of optical signals and a double-backscattered optical signal yield substantially a null of Bessel function J0;
coupling the plurality of optical signals out of the fiber optic resonator with the first coupling device and the second coupling device; and
sampling the plurality of optical signals with the at least one photodetector after the plurality of optical signals exits the fiber optic resonator.

10. The method of claim 9, wherein the path-length of the plurality of optical signals is modified using at least one fiber stretcher.

11. The method of claim 9, wherein the first and second coupling devices each comprise a weakly reflective mirror.

* * * * *